June 6, 1961 G. M. WALTON 2,987,138

COMBINED AIR FILTER AND TEMPERING DEVICE

Filed March 20, 1958 3 Sheets-Sheet 1

INVENTOR.
GEORGE M. WALTON
BY
Hyde, Meyer, Baldwin & Doran
ATTORNEYS

June 6, 1961 G. M. WALTON 2,987,138
COMBINED AIR FILTER AND TEMPERING DEVICE
Filed March 20, 1958 3 Sheets-Sheet 2
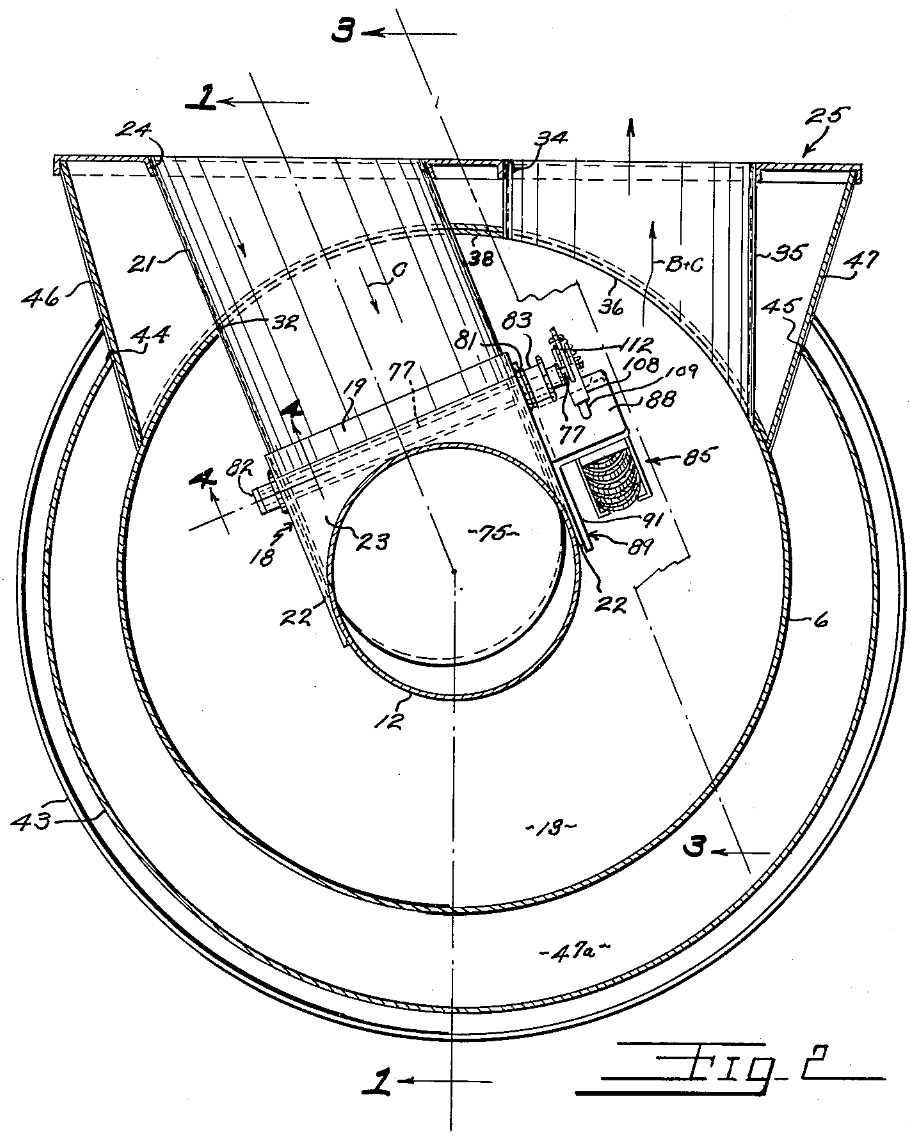
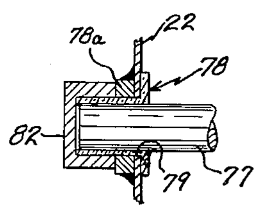
INVENTOR.
GEORGE M. WALTON
BY
Hyde, Meyer, Baldwin & Doran
ATTORNEYS June 6, 1961 G. M. WALTON 2,987,138
COMBINED AIR FILTER AND TEMPERING DEVICE
Filed March 20, 1958 3 Sheets-Sheet 3
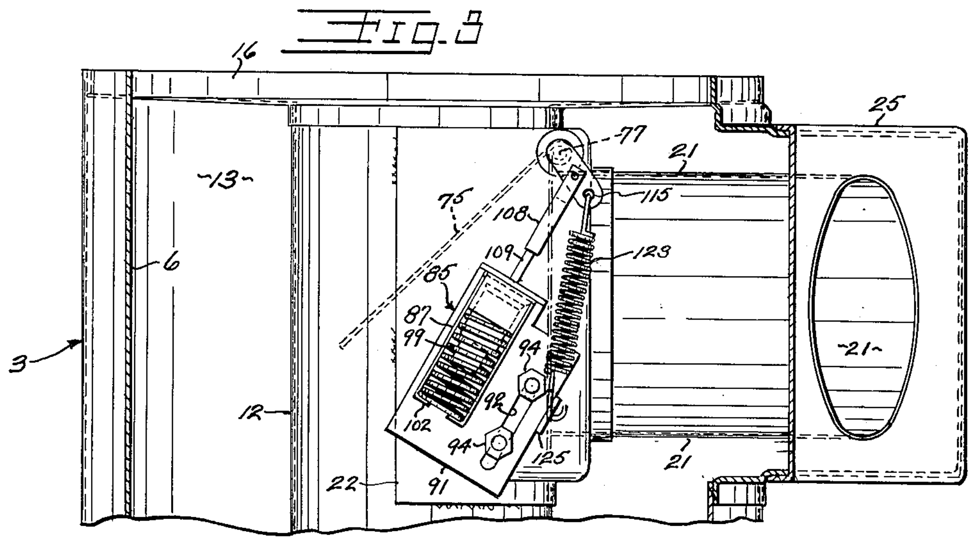
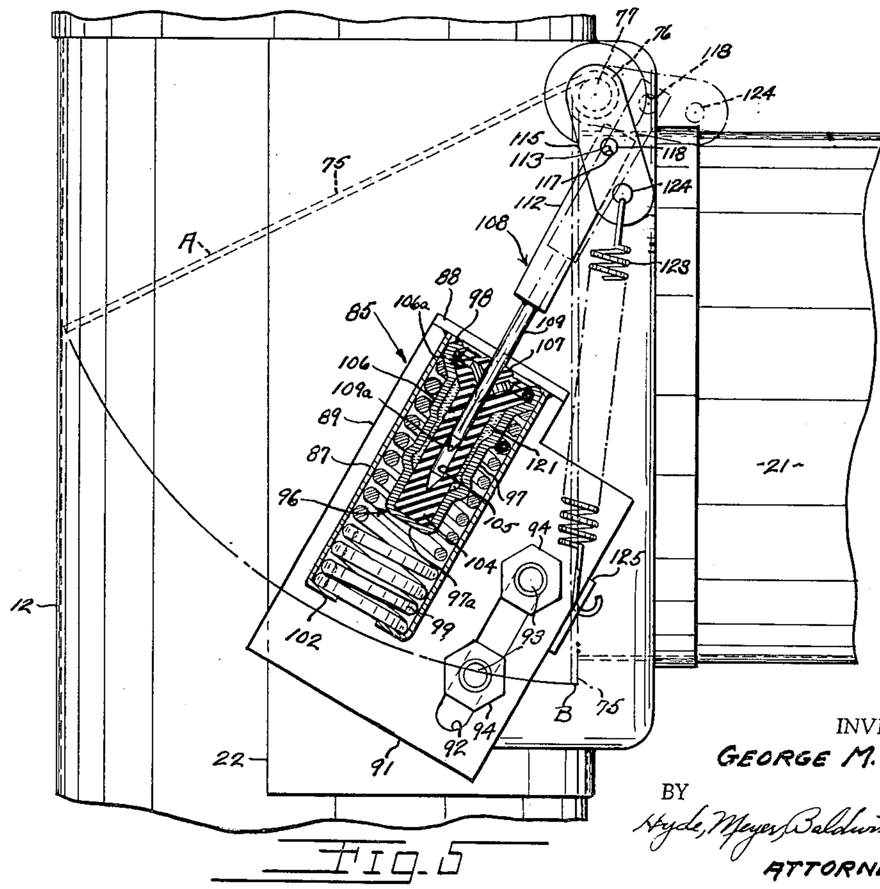
INVENTOR.
GEORGE M. WALTON
BY
Hyde, Meyer, Baldwin & Doran
ATTORNEYS United States Patent Office 2,987,138

Patented June 6, 1961

2,987,138
COMBINED AIR FILTER AND TEMPERING DEVICE

George M. Walton, Shaker Heights, Ohio, assignor, by mesne assignments, to Rockwell-Standard Corporation, Coraopolis, Pa., a corporation of Pennsylvania Filed Mar. 20, 1958, Ser. No. 722,816
1 Claim. (Cl. 183—40)

This invention relates to air controls and more particularly to an air filter and temperature control device wherein the air input flow to said device is modulated by means responsive to a preselected temperature of an output air stream from said device.

A primary object of the present invention is the provision of a novel and improved air filter and temperature control device wherein the input air flow to said device is variably modulated by means responsive to the temperature of the filtered output air stream flowing through said device at a position remote from said input air flow.

Another object of the present invention is the provision of a novel and improved air filter and temperature control device especially designed for use with a plurality of air inlet sources and wherein each of said inlet sources is variably modulated by means responsive to the temperature of the filtered air stream flowing through said device.

Still another object of the present invention is the provision of a novel and improved air filter of the stack type which is operative to provide an admixture of air from a plurality of separate air inlet sources and to produce therefrom a filtered and tempered output air stream, and wherein the said separate air inlet sources are each modulated by means on the outlet side of said filter and responsive to a preselected temperature for said output air stream.

Another object of the present invention is the provision of a novel and improved air filter of the stack type having a housing with air filtering means interposed between air inlet means and a filtered air chamber, the latter located downstream from said inlet means, and wherein means located in said chamber is responsive to the temperature of a filtered output air stream flowing therethrough to variably modulate the air input flow through said inlet means.

Another object of the present invention is the provision of a novel and improved air filter of the type referred to in the last paragraph and wherein the filtering means is further characterized by being constructed of a material suitable to effect an exchange of heat from an air stream flowing therethrough to the filtered air chamber, which heat is then effective to prevent a rapid fluctuation of the temperature responsive means in said chamber in the event the air flow into the inlet means varies rapidly over a short period of time.

Another object of the present invention is the provision of a novel and improved air filter of the stack type having a housing and air inlet means in said housing connected to a plurality of different tempered air inlet sources and communicating with an oil bath type of filtering means, the latter being effective to provide a filtered admixture of said air inlet sources to a filtered air chamber in said housing downstream from said filtering means, and wherein means responsive to the temperature of the output air stream from said air chamber is operative to variably modulate the air inlet sources through said inlet means.

Additional objects and advantages of the present invention will be realized by one skilled in the art to which it pertains and upon reference to the following disclosure of a preferred embodiment as illustrated in the accompanying drawings, and wherein:

FIG. 2 is a top view of the filter shown in FIG. 1 with a part of the upper exterior housing removed to more clearly show the internal construction of the filtered air chamber and the temperature responsive means located in the latter;

FIG. 3 is a view taken substantially on line 3—3 of FIG. 2 and shows the upper portion of the filter structure mounting the temperature responsive means in the filtered air chamber;

FIG. 4 is a sectional view taken substantially on line 4—4 of FIG. 2 and shows a novel bearing mounting for the shaft of the modulating valve in the instant form of temperature responsive means, and FIG. 5 is a view somewhat similar to FIG. 3 but substantially enlarged to more clearly show the several components of the instant form of temperature responsive means.

Figure 1:
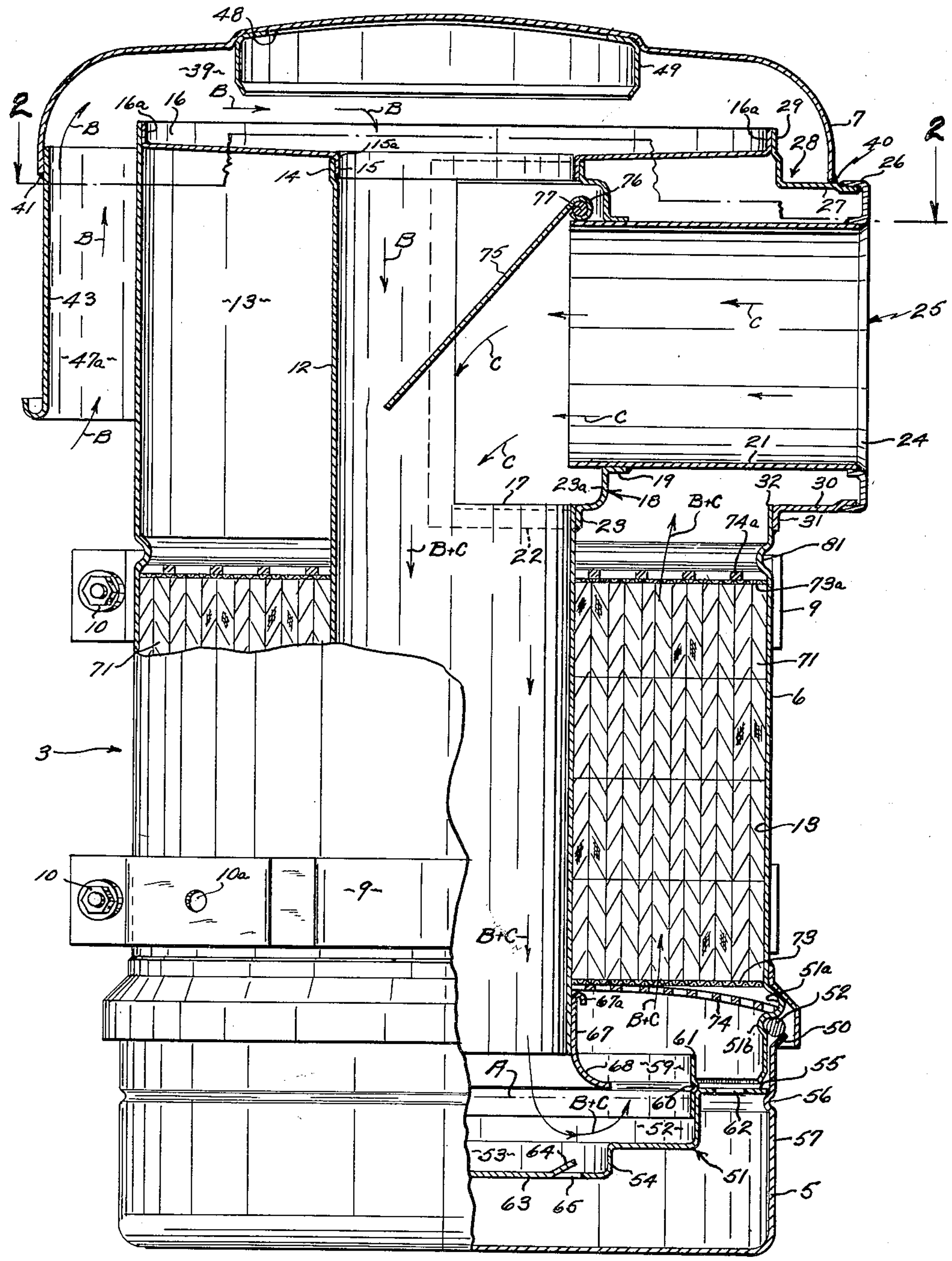
FIG. 1 is a vertical elevational view of an oil bath stack type filter embodying the present invention and taken substantially on line 1—1 of FIG. 2 but with the exterior housing partially broken away to show a preferred internal construction.

Referring now to the drawings, wherein like elements are designated by the same reference character, the novel and improved air filter and temperature control device of the present invention is herein embodied, merely for the purposes of illustration, in an oil bath type stack filter similar to that described in Patent No. 2,596,121 to Jacob K. Brixius, issued on May 13, 1952, and comprising a housing 3, which in its present form includes a lower bowl-shaped part 5 preferably adapted to be releasably attached to the lower end of a medial cylindrical part 6, the latter in turn being rigidly connected at its upper end to a canopy type cover 7. The instant form of stack type filter is adapted to be mounted in a vertical operative position such as is shown in FIG. 1 by means of a pair of suitable metallic bands 9 spaced longitudinally along the cylindrical part 6 and clamped thereon with fastening means 10 and having openings **10*a* through which the same may be attached to the mechanism utilizing said filter, such as an automotive type gasoline or diesel engine. Said stack type filter construction also includes an elongated cylindrical tube 12 which is placed centrally within the housing part 6, extending longitudinally therethrough in substantial radially inwardly spaced relation to define an annular chamber 13 therebetween. Said tube also has a narrow lip 14 on its upper end which extends closely around a rim 15, the latter depending downwardly from the periphery of an opening 15*a* formed centrally in a shallow dish-shaped plate 16, said rim being rigidly secured to the lip 14 by any suitable means such as welding or the like. The said plate, in turn, has an upwardly turned peripheral wall 16*a* which closely interfits the upper end of the tube 12 and, in like manner is rigidly attached to the same such as to seal off the upper end of the annular chamber 13**.

The annular wall of the tube 12, adjacent its upper end, is also provided with a substantially rectangular opening 17, and an adapter member 18 provided with parallel spaced wing plates 22 is placed over the said opening such that the aforesaid plates overlap the side edges of the latter, as is shown in FIG. 1, being rigidly secured thereto by any suitable means in substantially an air sealing relation. The overlapping parts of the wing plates may, if desired, be slightly laterally displaced such that the inside surface of the portion of said plates disposed in the tube opening 17 mates with the inside surface of the remaining curved part of the tube 12. This particular construction as is seen in FIG. 2 is substantially parabolic in sectional configuration, the reason for which will be hereinafter apparent.

The adapter member 18 is likewise formed with opposed end flanges 23 which are curved to conform to the configuration of the tube 12 and which are rigidly secured to the latter adjacent the top and bottom edges of said tube opening 17 in an air-tight relation. The end flanges 23 and wing plates 22 of said adapter member are integrally attached to a circular rim portion 19 by means of an outwardly curved wall 23*a*, said rim portion extending substantially perpendicularly outwardly of the end flanges 23, as seen in FIG. 1, with its center disposed in alignment with said tube opening.

An air inlet is adapted to be provided in said tube opening and for this purpose a cylindrical tube 21 has its one end extended through the aforesaid adapter rim portion 19 and secured thereto by any suitable method to prevent an air flow therebetween.

The opposite end of the tube 21 is disposed within a flanged opening 24 as viewed in FIG. 1, provided in a frame-like support member 25, the latter having an outer rim 26 substantially rectangular in form and connecting at its upper side to the base leg 27 of a right-angle support plate 28. Said support plate, in turn, is formed with an upstanding leg 29 which is shaped to conform to and likewise similarly attached to the adjacent rim portion 16*a* of the aforementioned dish-shaped plate 16. Said outer rim 26, at its lower end, is suitably attached to one end of a plate 30, the opposite end of said latter plate being bent downwardly at 31 and secured to one side of the cylindrical housing part 6, the same being cut away at 32 to accommodate the disposition of the aforementioned tube 21 and its associated support structure within said cylindrical medial housing part. In this manner, the tube 21 is in communication at its inner end with the aforesaid central tube 12 and extends radially outwardly of the housing and through the chamber 13, while being sealed off from the latter.

The frame-like support member 25 as is shown in FIG. 2 is also provided with a second flanged opening 34 into which is inserted an elongated tube 35, the outer end of the latter being attached to the peripheral wall defining said opening, whereas the opposite or inner end of said tube is disposed within an opening 36 formed in the upper end of the cylindrical medial housing part 6, being spaced circumferentially therealong from the aforesaid cut-out portion 32, whereby said tube is substantially horizontally disposed in said housing preferably in the same plane as the aforementioned tube 21. However, as is also seen in FIG. 2, the preferred disposition of the tube 21 is such that it projects radially into the housing toward its center, whereas the tube 35 extends into said housing in a direction substantially parallel to the axis of the latter. With this construction it is seen that the inner end of said latter tube 35 communicates with the upper portion of the annular chamber 13.

The wall of the cylindrical housing part 6, is also provided with a partition, as indicated at 38, which extends upwardly between the tubes 21 and 35, the edge of said partition being curved to closely fit the outside surface of the two tubes and rigidly fastened thereto by any suitable means in an air sealing relation. The opposed edges of the aforementioned cut-out portion 32 of said housing part are likewise rigidly attached to the outer curved surfaces of the tubes 21 and 35 in such manner as to prevent an air stream passing therebetween.

The canopy-like cover, as is seen in FIG. 1, is disposed above the cylindrical housing part 6 in substantially vertically spaced relation defining an inlet chamber 39 between said cover and the dish-shaped plate 16, said cover also having its one peripheral edge connected at 40 by welding or the like to the aforementioned leg 27 of the plate 28. In this manner, the annular edge on the open end of said cover, as is indicated at 41, is disposed radially outwardly of and below the upper end of the housing part 6, and is attached to the upper end of a curved skirt member 43, the latter of which has its opposed edges as designated at 44 and 45 in FIG. 2 rigidly fastened to the side plates 46 and 47, respectively of the aforementioned support member 25.

As is seen in FIG. 1, the skirt member 43 is spaced outwardly of the housing part 6 defining thereby an inlet chamber 47*a* communicating on its one end with the aforementioned inlet housing chamber 39 and on its opposite end with atmosphere. The central portion of the cover 7, as viewed in FIG. 1, is provided with a circular recess portion 48 which mounts a shallow cylindrical baffle member 49, the latter depending downwardly from said recessed portion while being disposed substantially directly above and facing the opening 15*a* in the plate member 16. This provides a deflector for oil blown up tube 12 from an engine backfire.

To complete the exterior housing structure in the present form of filter device, the bowl-shaped part 5 is releasably attached to the lower end of the medial housing part 6 by means of any suitable clamps or the like, such as is shown and described in the aforementioned patent, whereby the same may be readily removed from said housing part for the purposes of replacement or maintenance to the same and/or to the internal filter components contained therein which are presently to be described.

As seen in FIG. 1, the upper edge of the bowl-shaped part 5 may be flared outwardly at 50, whereas the adjoining lower end of the housing part 6 may be provided with an annular depression 51*b* substantially semi-circular in section, said preferred portions accommodating a suitable O-ring 52 or the like, being effective thereby to provide a fluid leak-proof seal therebetween.

The lower bowl-shaped part 5 also includes a shallow bi-level cup member 51 formed of a suitable imperforate material, and having in its instant form a cup portion 52 concentrically disposed outwardly of and above a lower cup portion 53, being integrally connected thereto by means of an annular wall 54 depending vertically therebetween. The cup member 51 is also formed with an annular rim 55, the latter being integrally attached to the top of the cup portion 52 and extending substantially laterally outwardly therefrom such that its peripheral edge rest upon the uper surface of an inwardly projecting depression 56 formed in the annular wall 57 of said housing part. A ring-shaped baffle member 59 has its one end disposed within the cup portion 52, and in addition is provided with a ridge portion at 60 extending circumferentially about its medial part and which engages with the adjoining edge of said upper cup portion and the aforesaid annular rim 55 such that the upper edge 61 of said baffle member, remote from the cup member 51, lies substantially in coplanar relation with the lower end of the tube 12, being spaced radially outwardly from the same.

The annular rim 55 of the cup member is also centrally formed with a plurality of apertures 62, the latter being circumferentially spaced about the surface thereof. In like manner, the base 63 of the lower cup portion 53 is formed having a plurality of circumferentially spaced tongues 64 struck upwardly therefrom defining openings 65 in said base.

The lower end of the central tube 12 rigidly mounts a tubular shaped baffle member 67, the latter also having a flared out portion at 68, which extends downwardly centrally within the confines of the aforesaid ring member 59, being radially inwardly spaced from the latter.

With the present filter structure, the bowl-shaped housing part 5 and cup member 51 thereof are adapted to hold a predetermined quantity of oil or any other suitable liquid adhesive preferably at a level such as in indicated at A in FIG. 1, and as will hereinafter be more fully described, and as is also disclosed in the aforementioned Brixius patent, said oil acts as a liquid bath to wash the dirt particles from a gaseous inlet stream as the same passes through the filter housing.

Also included as air filtering means in the structure herein disclosed is a filter element 71, which comprises in its present form, concentric layers of metallic foraminous screen-like material providing thereby an annularly shaped wire maze such as the construction disclosed in the United States Patent 2,190,683 granted to Albert E. Schaaf et al. on February 20, 1940.

As seen in FIG. 1 of the present drawings the filter element 71 is disposed in the lower portion of the annular chamber 13, and preferably has a longitudinal length such that its lower end is spaced above the adjoining end of the tube 12 and the aforesaid cup member 51, and its upper end is spaced below the aforementioned tube 21. Said filter element is held in this position by means including a flat layer of suitable metallic screen cloth 73, such as one having six meshes to the inch, being placed against the lower end of said element and held thereat by means of a metallic foraminous retainer plate 74, disposed directly underneath the latter and surrounding said central tube such that its center portion is interposed between said layer and an annular bead **67*a* formed on the upper end of the aforesaid baffle member 67. Said retainer plate extends across the lower end of the chamber 13 curving downwardly radially from its center, whereas its peripheral edge is disposed and retained within an annular recessed portion 51*a* provided in the wall of the housing part 6, preferably juxtaposed to the aforementioned annular depression 51. The filter element 71 is similarly held at its upper end in its operative position as depicted in FIG. 1 by means including a metallic cloth layer 73*a* preferably identical to the aforesaid layer 73, being placed against the said upper end, and held thereat by a flat annular-shaped metallic retainer plate 74*a* formed preferably of a coarse mesh screen-like material and disposed over said cloth layer while having its peripheral edge retained in place by an annular inwardly projecting shoulder portion 81 formed substantially in the center of the housing part 6**.

With the filter element 71 thus positioned, the upper part of the housing chamber 13, i.e., that portion above the aforesaid filter element, or the chamber portion located on the downstream side of said element as is identified by the reference character **13*a* in FIG. 1, may be hereinafter referred to as the filter air chamber or compartment. Likewise, the filtered air chamber 13*a* as just defined is seen to communicate through the tube 35 with the outside of the filter housing 3**, hence said tube may be hereinafter referred to as the filtered air outlet tube.

The air filter structure described thus far is especially designed for use with an internal combustion engine or the like, being adapted to combine a relative cold, dirt laden air inlet stream with a relatively hot and similarly conditioned air stream, the latter preferably emanating from a suitable heating jacket about the exhaust manifold or the like on the engine, to provide therefrom a clean filtered outlet air stream for said engine whose temperature is somewhere in between the temperature of each of said inlet streams.

To accomplish this, the tube 35 communicating with the aforementioned filtered air compartment **13*a* is connected to the air intake manifold or the like of said engine which induces a suction and hence causes the proper direction of air flow through said device as will be hereinafter apparent. The tube 21, in like manner, is connected in circuit with the jacket about the exhaust manifold or the like of said engine whereby a source of relatively hot, dirt laden air is permitted to flow through said tube and into the central tube 12** of the filter structure.

With the filter device connected in this manner to said engine, a stream of relatively cold, dirt laden air is drawn or sucked into the aforesaid air inlet chamber **47*a* in the direction of and as is identified by the arrows B, and thence into the filter housing chamber 39. Said cold air inlet flow is thence directed by the baffle member 49 into the central tube 12 wherein it flows therethrough in a downward direction as viewed in FIG. 1. At the same time, a stream of relatively hot, dirt laden air is projected through the tube 21 in the direction as is designated by the arrows C and thence into the central tube 12, wherein said stream combines or mixes with the aforesaid cold air inlet stream. As a result, the hot air inlet stream gives up some of its heat to the cold air inlet stream; consequently the temperature of the mixture is somewhere in between the respective temperature of each of said inlet streams. The mixture of dirt laden, hot and cold air, as is identified by the arrows (B and C), is then directed downwardly through the central tube 12 and out of the bottom of the same, being directed radially outwardly therefrom and into the lower end of the housing part 6 by the flared portion 68 of the aforesaid baffle member 67. Said dirty air mixture is then subjected to the filtering action of the oil-bath contained within the bowl-shaped housing part 5 and to the filtering action of the element 71 as the same courses upwardly through the chamber 13**. The functioning of said filtering components is completely and clearly described in the aforementioned Brixius patent, and hence a further discussion herein is not considered necessary.

Consequently, as the air mixture emerges upwardly out of the filter element 71, and into the filtered air chamber or compartment **13*a*, it is substantially free of any extraneous or foreign matter, and is then drawn out of said compartment as a well defined clean air outlet stream through the outlet tube 35** and to the engine proper wherein it is utilized.

As previously mentioned, it is also contemplated that the air filter of the present invention is to be responsive to a preselected temperature condition such as to provide an outlet stream of clean air having a substantially constant temperature. For this purpose, the form of air filter shown herein is provided with novel means which function to modulate each of the cold and hot air inlet stream flows, being effective thereby to regulate the proportionate amount of each of the latter which is permitted to enter and mix within the central tube 12 of the filter housing 3. And, as will hereinafter be apparent, said novel valve means is actuatable by means responsive to the temperature of the clean filtered air mixture in the aforesaid filtered air compartment **13*a***.

To accomplish this operational result, the instant form of valve means includes a damper vane or valve plate 75 having an elongated hinge eye 76 formed on its one end which is journalled on a shaft 77, the latter being mounted at its ends to the aforesaid wing plates 22 of the adapter member 18 preferably located slightly above the inner end of the tube 21. With reference now directed to FIG. 4, the mounting for the ends of the shaft includes a bearing 78, preferably formed of a suitable synthetic material such as nylon, being provided with a shank part which protrudes through an aperture 79 in the wing plate 22, and an enlarged head which is adapted to engage with the inner surface of said plate adjoining the aforesaid aperture 79. A suitable bushing **78*a* may be rigidly mounted to the opposite face of the wing plate to afford additional support thereto. In addition, the shaft 77 is journalled in the wing plate such that each end thereof protrudes outwardly beyond the bushing 78*a* associated therewith. A cup-shaped member as indicated at 82 in FIG. 4, may be placed over one end of said shaft and the shank part of the aforesaid bearing 78 to seal the same from the housing filtered air chamber 13*a* such that moisture or any other extraneous matter is prevented from collecting on said mounting. The opposite end of the shaft 77 as indicated in FIG. 2, in place of cap 82 has a sleeve-like rubber seal or grommet 83 mounted over the shaft preferably inwardly of the extremity thereof and closely adjacent the bushing 81 mounted on the adjoining adapter wing plate 22**. Said grommet or sleeve is also operative to prevent the penetration of foreign material into the shaft mounting in juxtaposition thereto.

As seen in FIGS. 2 and 5, the damper vane or valve plate 75 is substantially parabolic in configuration at its free end, being of such dimensions, and also swingably suspended from the aforesaid shaft 77, as to be movable in a counterclockwise direction (FIG. 5) to a vertical position such as is indicated in dot-dash lines wherein it seals off the adjacent end of the hot air inlet tube 21 thus shutting off the dirty hot air inlet stream from the central tube 12.

In addition the particular configuration and size of the valve plate 75 is such that with the same swingably moved to its fully clockwise position, as seen in dash-dash lines in FIG. 5, it substantially completely seals off the central tube 12 and hence shuts off the dirty cold air inlet stream to the filter housing 3. Hence, the extreme positions for said valve plate, as just described, defines the outer limits of movement for the same whereby said plate is adapted to be adjustably movable to modulate the hot and cold dirty air inlet streams and thereby selectively regulate the proportion of each of said streams that is permitted to enter and mix within the central tube 12.

To provide for the selective actuation of the damper or valve plate 75 such that it modulates the dirty hot and cold air inlet streams in response to a predetermined temperature condition established for the outlet stream of clean filtered mixed air, the instant form of filter device includes thermo-responsive means identified in general by the reference character 85, which are disposed in the air chamber **13*a*** and drivably connected to the aforesaid valve plate, being operatively conditioned in a manner presently to be described to selectively move said plate to any position within said above defined limits.

More specifically, the instant form of thermo-responsive means preferably includes a holder 87 rigidly attached at its one end to an upstanding leg 88 of a mounting bracket 89. Said bracket, as in shown in FIG. 2, is preferably adjustably attached to one of the aforesaid wing plates 22 adjacent the end of the damper valve shaft 77 mounting the aforesaid grommet 83. For this purpose, the base leg 91 of the bracket 89 may be formed with an elongated slot 92 through which a pair of threaded fasteners 93 protrude, the latter, in turn, being carried by the adjoining wing plate 22. Locking means, which in the present form, comprises a pair of hex-nuts 94 may be threadably disposed on said fasteners and conditioned therein to resiliently engage with the surface of the base leg 91 adjoining said slot, and hence retain said bracket and holder in any preselected position, the reason for which will be presently explained.

A thermo-responsive motor identified at 96, and which comprises in its instant form, a substantially cylindrical outer casing 97 having a closed end **97*a*, said casing preferably constructed of a high heat conductive material such as brass, is disposed centrally within the holder 87 adjacent its said one end. Said casing is formed with an enlarged annular rim 98 on its one end which is biased into engagement with the aforesaid upstanding leg 88 of said mounting bracket by means of a suitable coil spring 99 surrounding said motor casing and having its one end engaging with the end wall 102 of said container 87** and its opposite end pressing against the outside surface of said annular rim. As is seen in FIG. 5, said coil spring is normally in a preloaded condition such that said motor casing is biased toward said bracket leg under the influence of a predetermined spring pressure, the function and purpose for which will be presently explained.

Mounted within the motor casing 97 is a cylindrical shaped actuator member 104 formed of a suitable pliable material such as soft rubber and having a dead end channel 105 integrally formed centrally through the same. As seen in FIG. 5, said actuator member 104 rests upon the interior surface of the closed end **97*a* of said motor casing, and thence extends centrally through the latter radially inwardly spaced from the medial and opposite end portions of said casing, said portions being slightly laterally outwardly spaced to define an annular chamber 106 therebetween. The opposite end of said actuator member flares outwardly at 106*a* to rest against the inside surface of the annular rim 98 on said motor casing to effectively seal said annular chamber. A suitable grommet or the like, as indicated at 107, may be, in turn, placed over the latter end of said actuator member, and the extremity of said annular rim may then be spun or otherwise suitably formed to extend over and into pressure engagement with the outside surface of said grommet. In this manner, the actuator member is retained within the cylindrical motor casing 97. The grommet 107 is also centrally apertured, as is the upstanding leg 88 of the mounting bracket 89 such as to be in substantial alignment with the dead end channel 105** in the aforesaid actuator member.

An actuator shaft 108 is provided with a cylindrical rod part 109 on its one end which is slidably extended through the bracket leg 88 and grommet 107 and into the channel 105 of the aforesaid actuator member. The inner end of rod part 109 may in addition, be pointed as indicated at **109*a*. The opposite end of said shaft is bifurcated to form a pair of parallel spaced arms as indicated at 112 in FIGS. 2 and 5, each of said arms, in turn, having an aperture 113** provided centrally therein adjacent its free end.

The actuator shaft 108 is connected in driving relation with the aforementioned damper valve shaft 77, and for this purpose an elongated link 115 is mounted at its one end to the end of said valve shaft 77 projecting outwardly of the rubber seal 83. Said link is adapted to be placed between the spaced arms 112 on said actuator shaft, and in addition is provided with an aperture 117 located substantially at its medial part. Said link is positioned such that the apertures 113 and 117 on the arms 112 and said link, respectively, are in alignment, whereby a pin 118 is then extended completely therethrough to linkably connect the same together.

With this construction, the thermo-responsive motor 96 is adapted to drive the actuator shaft 108 in response to a predetermined temperature condition in the outlet air chamber **13*a* of the filter structure, and then by means of the linkable connection part described, swing the damper or valve plate 75 to a preselected position within the central filter tube 12** and thereby modulate the dirt laden hot and sold inlet air stream flow.

To accomplish this, a suitable quantity of a heat responsive material such as a wax-like substance, as indicated at 121, is deposited in the aforesaid annular chamber 106 of the motor 85. Hence, with the outer casing 97 of said motor having high heat conducting properties, the prevailing temperature within the outlet air chamber **13*a* of the filter housing is directly effective upon said heat responsive material to condition the same accordingly. The thermo responsive properties of said material are such that upon being subjected to a higher temperature it tends to expand, and conversely, upon subjecting the same to a lower temperature it tends to contract. The above thermo-responsive characteristics of said material are applicable in a manner now to be described to move the aforementioned actuator shaft 108 and hence swing the damper or valve plate 75** corresponding to the increase and/or decrease in said temperature.

Let us assume first that the damper is at the position marked A in FIG. 5 wherein the central tube 12 is sealed off at a plane above the hot air inlet tube 21. In this condition only dirt laden hot air is allowed to flow through said central tube and the filtering elements connected in circuit therewith and thence into the outlet air outlet chamber **13*a*. As a result, the temperature within said air outlet chamber is increased. The heat responsive material 121 will thence be subjected to and likewise responsive to said temperature increase by reason of the high heat conductive properties of the intermediary motor casing. Said material will therefore experience an expansion within the aforesaid motor casing 106 such that it tends to squeeze the pliable rubber-like actuator member 104. When this occurs said latter member is displaced and/or flows into its centrally located channel 105 in such manner that the rod part 109 of the actuator shaft 108 is forced longitudinally outwardly of the casing 97 as seen in FIG. 5. Consequently, the movement of said actuator shaft is effective to swing the damper 75 in a counterclockwise direction to a new location within the central filter tube 12 corresponding to the actual increase in said temperature whereby the proportion of hot dirt laden inlet air into the central filter tube 12** is decreased while that of the cold inlet air is increased.

In like manner, with the damper 75 supported in an actuated condition, such as is illustrated in FIG. 3, and with a decrease in the temperature of the outlet air chamber 13*a*, the temperature of the aforesaid heat responsive material 121 will likewise decrease whereby said material will contract and allow the pliable rubber-like actuator member to expand accordingly. Consequently, the actuator shaft 108 is thence able to slide downwardly into the aforesaid central chamber 105 within said actuator member a linear distance corresponding to said decrease in temperature and hence swing the damper 75 clockwise or upwardly as viewed in FIG. 3 to a new position whereby the proportion of hot inlet air is increased accordingly while that of the cold inlet air is decreased.

In order to provide a more positive action for the last described movement of the actuator shaft 108, a suitable coil spring 123 has its one hook-shaped end passed through an aperture 124 provided in the free end of the link 115 and its opposite end similarly secured to an anchor plate 125. With this construction it is now realized that the coil spring 123 positively biases the link 115 and hence the damper or valve plate 75 in a clockwise direction such as is viewed in FIG. 5. In this manner, the actuator shaft 108 is likewise biased in a direction substantially longitudinally toward and centrally into the centrally into the aforesaid actuator member 104. Several additional operational characteristics attributed to the coil spring 123 and also to the coil spring 99 mounted within the aforementioned container 87 will be described in further detail hereinafter.

In its present use, the air filter structure described thus far is preferably operable to provide a clean, filtered supply of air to the engine or the like connected in air circuit therewith, at a preselected temperature within a range of 65–90 degrees Fahrenheit, the optimum temperature being the medial point in said range or approximtaely 77.5 degrees F. Therefore, with this temperature range selected as the extreme working limits for the present form of air filter, the operating characteristics of the heat responsive material 121 and of the coil spring 99 and 123 may be then chosen to provide a direct, substantially instantaneous actuation of the shaft 108 and connected damper 75 in response to any increment of temperature differential that is likely to be encountered. For instance, the heat responsive material 121 is preselected such that it provides substantially linear actuation for the shaft 108 throughout the above defined temperature range. Additionally, said material is selected such that at the upper temperature limit said shaft is actuated thereby to move the damper 75 such as to substantially close the hot air inlet tube 21 from the central filter tube 12. In like manner, at the lower temperature limit as above defined, the characteristics of said material are such as to permit the swinging of the damper 75 to a position to close said central tube adjacent the aforesaid opening 15*a* in the plate 16 and hence prevent the ingress of additional cold, dirt laden air through the latter. In cooperative association with said last described characteristic of the heat responsive material, the modulus of the coil spring 123 is such as to positively swing the damper 75 and seal the aforementioned central tube 12.

In like manner, with the damper moved to its position B, wherein the tube 21 is sealed from the central tube 21 and further movement of the actuator shaft does not result in any additional movement to said damper, a subsequent increase in the temperature in the air outlet chamber 13*a* above the 90 degrees F. upper limit conditions the heat responsive motor 96 to continue forcing the actuator shaft 108 out of the actuator member 104. Ordinarily, under these conditions, an excessive force would be applied to said actuator shaft which might tend to shear the same or damage its connection with the damper shaft 77, or possibly destroy the seal of said damper with respect to the tube 21. However, with the motor 96 mounted within the coil spring 99 in the manner above described, the modulus of said spring is such that under the above conditions said motor is slidably forced downwardly through the container 87 compressing said spring and therefore prevents an excessive force from developing and being applied to said shaft. Hence, said coil spring acts as an overtravel compensating device for the heat responsive motor 96, such that the latter may be used in atmospheres when the temperature is normally within the preselected range as above defined but where they may be times when said temperature may momentarily exceed the upper limit of said range.

Still another important feature of the filter device of the present invention relates to the structural characteristics of the filter element 71 and the novel manner in which the same is operative when located in juxtaposition to the air outlet chamber 13*a* to prevent erratic oscillations and/or "hunting" of the damper 75, as referred to in the art.

As previously mentioned, the filter element 71 is preferably constructed of a suitable metallic material, such as steel, brass or aluminum, and takes the form of a maze of wires closely intermeshed to provide a tortuously or random arranged multitude of interstices through which courses the dirty air inlet flow. Being of a metallic material said element is therefore capable of absorbing and/or radiating heat energy. Likewise, the mass of said element is preferably chosen in its instant form as to enable the same to store up a suitable quantity of heat energy and thus function, so to speak, as a reservoir.

With these structural relationships in mind and with said filter element thus located, it is then apparent that when the same is subjected to an air flow whose temperature is higher than that of said element, for example, at the medial range of the operational limits for the heat responsive motor 96, as above referred to, said filter element will take on heat from said flow. Consequently, after the lapse of a predetermined period of time, depending upon the mass of said filter element, the temperature of the latter will be raised to approximately the same or possibly to a slightly lower temperature value than that of said air flow. And, in addition, partly as a result of said air flow, and also of the heat radiating characteristics of the filter element, the temperature of the air outlet chamber 13*a* is also raised to a corresponding level. And, as a result of the temperature of said chamber, the heat responsive motor 96 will be actuated in the manner as above described to condition the aforesaid damper 75 such as to sustain this particular air inlet flow.

Thereafter, for example, if the temperature of the air inlet flow suddenly momentarily decreases, the filter element will give off or radiate heat energy to said flow which is then transmitted by the latter to the air outlet chamber 13*a*. As a result, the temperature of said chamber is sustained near its previously acquired corresponding level during the transitional period for said air inlet flow, and hence the aforesaid motor 96 remains at its previously actuated condition or moves slowly and the aforementioned particular air inlet flow control damper is not suddenly moved with each slight variation in temperature at an air inlet.

In like manner, if the temperature of the air inlet flow suddenly momentarily increases, the filter element also functions to absorb heat energy from said flow to prevent the same from being projected in unmodified condition into the air outlet chamber 13*a*, such that the temperature of the latter is changed more slowly from its previously acquired level.

Consequently, it is realized that the metallic filter element, as thus located juxtaposed to the air outlet chamber 13*a*, is operative as a heat storage reservoir to prevent a transition in the temperature of the air inlet flow from affecting the temperature of said air outlet chamber until a predetermined period of time has elapsed, which time may be proportionally related to the mass of the filter element, such that the aforesaid motor 96 and damper 75 is prevented from continuously seeking or "hunting" a newly actuated condition.

With the structure and operational features of the filter device of the present invention as just described it is now realized that the objects as enumerated above, among others have been obtained, and although merely one form is herein disclosed, it is apparent that the same is susceptible to various modifications, arrangements, and combinations of parts without departing from the inventive concepts as defined in the claim.

What is claimed is:

A self-contained air filter comprising a housing having separate cold and warm air inlets and passageways leading therefrom inside of said housing to a common junction, a mass of metallic air filtering material in said housing downstream from said junction, an air discharge passageway downstream from said filtering material and leading to the outside of said housing, a portion of said discharge passageway lying just outside of said common junction of said air inlets, said housing and passageways compelling all air flow to move from said inlets, through said filtering material and out said discharge passageway, a damper valve movably mounted at said common junction and constructed and arranged for variable movement allowing various mixtures of cold and warm air to pass from their respective inlets through said common junction, a thermo responsive device in said portion of said discharge passageway, and a direct operative connection between said device and said damper valve passing through the wall of said passageways and effective to vary the position of said valve responsive to said device, whereby said metallic filtering material acts as a heat storage reservoir effective to smooth out the effect on said thermo responsive device of sudden changes of temperature at said junction.

References Cited in the file of this patent

UNITED STATES PATENTS

| | | |
|---|---|---|
| 1,221,956 | Benjamin | Apr. 10, 1917 |
| 2,058,204 | Ball et al. | Oct. 20, 1936 |
| 2,365,299 | Sebok | Dec. 19, 1944 |
| 2,763,251 | Dolza | Sept. 18, 1956 |
| 2,781,032 | Sebok et al. | Feb. 12, 1957 |
| 2,788,086 | Sebok | Apr. 9, 1957 |

FOREIGN PATENTS

| | | |
|---|---|---|
| 787,534 | Great Britain | Dec. 11, 1957 |